US012619898B1

(12) United States Patent
Gonciulea et al.

(10) Patent No.: US 12,619,898 B1
(45) Date of Patent: May 5, 2026

(54) SYSTEMS AND METHODS FOR PREPARATION OF A QUANTUM STATE ENCODING AN APPROXIMATE NORMAL DISTRIBUTION

(71) Applicant: Wells Fargo Bank, N.A., San Francisco, CA (US)

(72) Inventors: Constantin Gonciulea, Summit, NJ (US); Vanio Markov, New York, NY (US); Charlee Alexandra Stefanski, New York, NY (US); Abhijit Bhima Rao, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 872 days.

(21) Appl. No.: 17/934,105

(22) Filed: Sep. 21, 2022

(51) Int. Cl.
  G06N 10/40 (2022.01)

(52) U.S. Cl.
  CPC .................................... G06N 10/40 (2022.01)

(58) Field of Classification Search
  CPC ...................................................... G06N 10/40
  See application file for complete search history.

(56) References Cited

U.S. PATENT DOCUMENTS

| | | | | | |
|---|---|---|---|---|---|
| 11,516,190 | B1 * | 11/2022 | McCarty | .............. | H04L 9/0858 |
| 11,593,707 | B2 * | 2/2023 | Romero | ................ | G06N 20/00 |
| 11,694,107 | B1 | 7/2023 | Budinski | | |
| 12,346,770 | B2 * | 7/2025 | Babbush | ................ | G06F 15/16 |
| 12,530,607 | B1 * | 1/2026 | Gonciulea | .............. | G06N 10/20 |
| 2003/0005010 | A1 | 1/2003 | Cleve | | |
| 2011/0153257 | A1 * | 6/2011 | Ishizaka | ................ | B82Y 10/00 |
| | | | | | 702/109 |
| 2018/0096258 | A1 | 4/2018 | Burchard | | |
| 2020/0089832 | A1 | 3/2020 | Shao | | |
| 2020/0104740 | A1 * | 4/2020 | Cao | ........................ | G06N 10/60 |
| 2020/0334563 | A1 | 10/2020 | Gambetta | | |
| 2020/0342344 | A1 | 10/2020 | Gambetta | | |
| 2021/0271477 | A1 * | 9/2021 | Jiang | ...................... | G06N 10/60 |
| 2021/0271999 | A1 * | 9/2021 | Paik | .......................... | G06E 1/00 |

(Continued)

OTHER PUBLICATIONS

Vanio Markov, Charlee Stefanski, Abhijit Rao, and Constantin Gonciulea. "A Generalized Quantum Inner Product and Applications to Financial Engineering". 2022.

(Continued)

*Primary Examiner* — David E Choi
(74) *Attorney, Agent, or Firm* — K&L Gates LLP

(57) ABSTRACT

Systems, apparatuses, methods, and computer program products are disclosed for preparation of a quantum state encoding an approximate normal distribution (QSEAND) in a set of qubits. An example method includes initializing the set of qubits by preparing the set of qubits in an initial quantum state. The example method also includes encoding the approximate normal distribution in the quantum state of the set of qubits, wherein encoding the approximate normal distribution comprises preparing the set of qubits to be in a quantum state representing a plurality of Fourier coefficients, and applying an inverse quantum Fourier transform to the set of qubits in the quantum state representing the plurality of Fourier coefficients to obtain the QSEAND. The example method also includes utilizing the QSEAND, wherein the utilization alters or transfers the QSEAND.

20 Claims, 5 Drawing Sheets

(56) References Cited

U.S. PATENT DOCUMENTS

| | | | | |
|---|---|---|---|---|
| 2021/0357229 | A1 | 11/2021 | Gonciulea | |
| 2021/0365622 | A1* | 11/2021 | Gonthier | G06F 30/367 |
| 2022/0391468 | A1* | 12/2022 | Sun | G06F 17/145 |
| 2023/0030423 | A1 | 2/2023 | Rubin | |
| 2023/0036827 | A1 | 2/2023 | Herbert | |
| 2023/0385676 | A1* | 11/2023 | Mentovich | G06N 10/60 |
| 2024/0020568 | A1* | 1/2024 | Orus Lacort | G06N 10/60 |
| 2024/0119326 | A1* | 4/2024 | Satzinger | G06F 15/16 |
| 2024/0152794 | A1* | 5/2024 | Chiaro | G06N 10/70 |
| 2024/0183670 | A1 | 6/2024 | Ushijima-Mwesigwa | |
| 2024/0193450 | A1* | 6/2024 | Naveh | G06N 10/20 |
| 2024/0220836 | A1* | 7/2024 | Debroy | G06N 10/70 |
| 2025/0181951 | A1* | 6/2025 | Gross | H03K 19/195 |

OTHER PUBLICATIONS

Lov K Grover. "A fast quantum mechanical algorithm for database search. In Proceedings of the twenty-eighth annual ACM symposium on Theory of computing", pp. 212-219, 1996.

Don Coppersmith. "An approximate fourier transform useful in quantum factoring. Technical Report IBM Research Report RC19642", IBM, 1994.

Austin Gilliam, Charlene Venci, Sreraman Muralidharan, Vitaliy Dorum, Eric May, Rajesh Narasimhan, and Constantin Gonciulea. "Foundational patterns for efficient quantum computing", 2021. URL: https://arxiv.org/abs/1907.11513.

Austin Gilliam, Stefan Woerner, and Constantin Gonciulea. "Grover adaptive search for constrained polynomial binary optimization". Quantum, 5:428, Apr. 2021. ISSN 2521-327X. DOI: 10.22331/q-2021-04-08-428.

Maria Schuld and Nathan Killoran. "Quantum machine learning in feature hilbert spaces". Physical Review Letters, 122(4), Feb. 2019. ISSN 1079-7114. DOI: 10.1103/physrevlett.122.040504.

Ryan O'Donnell. "Analysis of boolean functions". CoRR, abs/2105. 10386, 2021. URL: https://arxiv.org/abs/2105.10386.

Steven Herbert. "No. quantum speedup with grover-rudolph state preparation for quantum monte carlo integration". Physical Review E, 103(6), Jun. 2021. ISSN 2470-0053. DOI: 10.1103/physreve. 103.063302.

Stefan Woerner and Daniel J. Egger. "Quantum risk analysis". npj Quantum Information, 5 (1), Feb. 2019. ISSN 2056-6387. DOI: 10.1038/s41534-019-0130-6.

David H Raab and Edward H Green. "A cosine approximation to the normal distribution". Psychometrika, 26(4):447-450, 1961. ISSN 0033-3123.

Nikitas Stamatopoulos, Daniel J. Egger, Yue Sun, Christa Zoufal, Raban Iten, Ning Shen, and Stefan Woerner. "Option pricing using quantum computers". Quantum, 4:291, Jul. 2020. ISSN 2521-327X. DOI: 10.22331/q-2020-07-06-291.

Harry Buhrman, Richard Cleve, John Watrous, and Ronald de Wolf. "Quantum fingerprinting". Physical Review Letters, 87 (16), Sep. 2001. ISSN 1079-7114. DOI: 10.1103/physrevlett.87.167902.

Seth Lloyd, Masoud Mohseni, and Patrick Rebentrost. "Quantum algorithms for supervised and unsupervised machine learning", 2013.

Francesco Tacchino, Chiara Macchiavello, Dario Gerace, and Daniele Bajoni. "An artificial neuron implemented on an actual quantum processor". npj Quantum Information, 5(1), Mar. 2019. ISSN 2056-6387. DOI: 10.1038/s41534-019-0140-4.

Yunchao Liu, Srinivasan Arunachalam, and Kristan Temme. "A rigorous and robust quantum speed-up in supervised machine learning". CoRR, abs/2010.02174, 2020. URL: http://dblp.uni-trier. de/db/journals/corr/corr2010.html#abs-2010-02174.

Botsinis et al., "Quantum Search Algorithms for Wireless Communications", in IEEE Communications Surveys & Tutorials, vol. 21, No. 2, Second Quarter 2019, pp. 1209-1242.

Schuld et al., "The effect of data encoding on the expressive power of variational quantum machine learning models", arXiv preprint arXiv:2008.08605vs, Oct. 9, 2021 (16 pages).

* cited by examiner

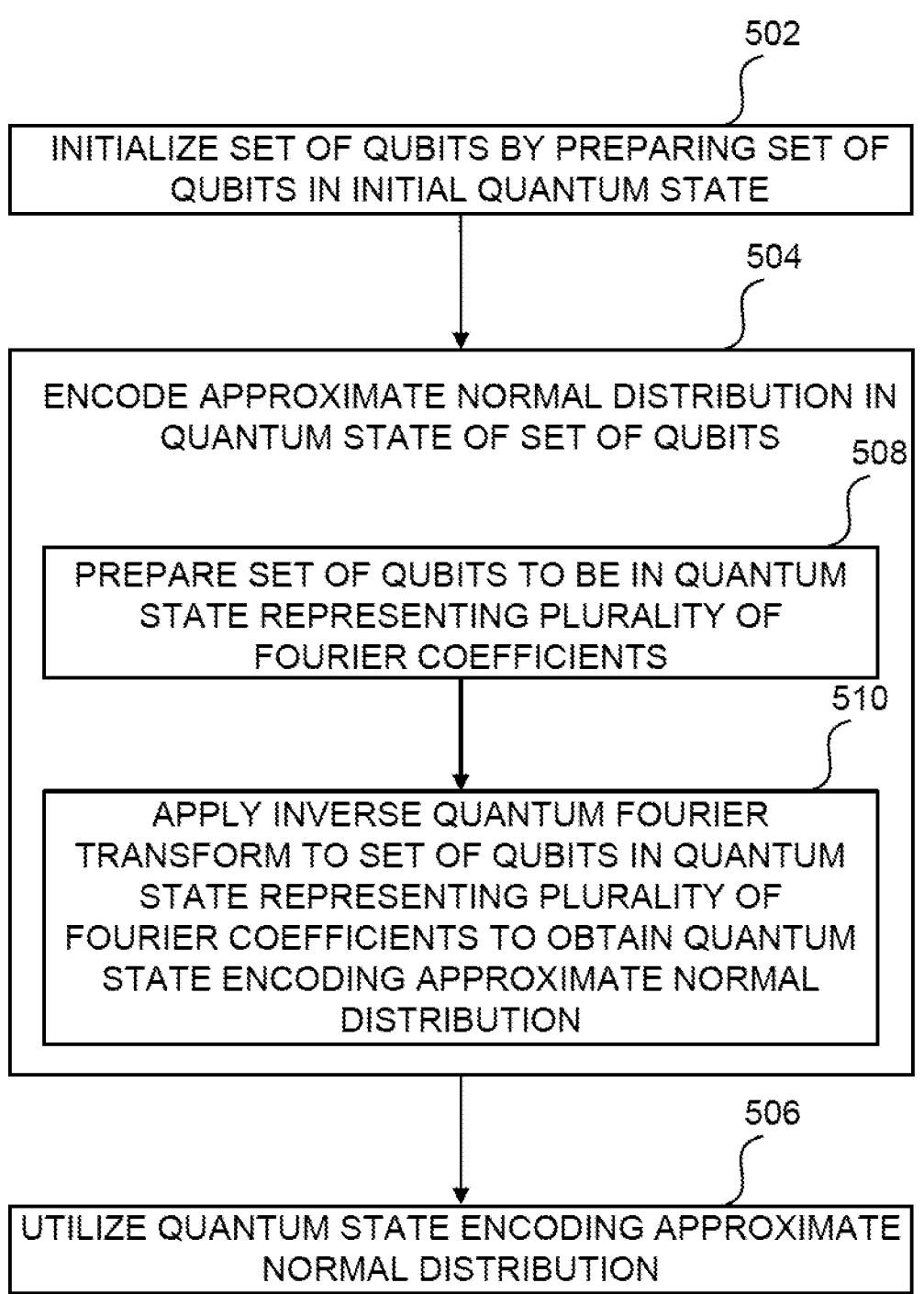

502

INITIALIZE SET OF QUBITS BY PREPARING SET OF QUBITS IN INITIAL QUANTUM STATE

504

ENCODE APPROXIMATE NORMAL DISTRIBUTION IN QUANTUM STATE OF SET OF QUBITS

508

PREPARE SET OF QUBITS TO BE IN QUANTUM STATE REPRESENTING PLURALITY OF FOURIER COEFFICIENTS

510

APPLY INVERSE QUANTUM FOURIER TRANSFORM TO SET OF QUBITS IN QUANTUM STATE REPRESENTING PLURALITY OF FOURIER COEFFICIENTS TO OBTAIN QUANTUM STATE ENCODING APPROXIMATE NORMAL DISTRIBUTION

506

UTILIZE QUANTUM STATE ENCODING APPROXIMATE NORMAL DISTRIBUTION

FIG. 5

SYSTEMS AND METHODS FOR PREPARATION OF A QUANTUM STATE ENCODING AN APPROXIMATE NORMAL DISTRIBUTION

BACKGROUND

Quantum computers promise to provide significant advantages for solving particular problems that are difficult or costly for classical computers to solve. However, the loading of data onto a quantum computer remains a computationally difficult problem that threatens to negate many of the advantages gained by utilizing quantum algorithms. In particular, the normal distribution is widely used but notoriously difficult to load on quantum computers.

BRIEF SUMMARY

Although still in its infancy, quantum computing and its potential applications are of rapidly increasing interest to a broad array of industrial sectors, including complex simulation, artificial intelligence, healthcare, and financial services. Unlike classical computers, which process information in bits that can only represent one of two binary information states at a time, quantum computers process information in quantum bits (qubits) that can represent a coherent superposition of both binary information states at the same time. Two or more qubits may be entangled so that their physical properties are correlated even when separated by large distances, and quantum computers may simultaneously perform a vast number of operations on these entangled qubits. These features allow quantum computers to perform incredibly complex calculations at speeds not realizable today and solve certain classes of problems that are beyond the capability of existing classical computers.

Quantum computing is one of an array of emerging quantum technologies that present a wide field of potential applications. Quantum sensing and quantum communications are expected to have wide-ranging technological impact, and advances in the field of quantum computing may enable or find further applications in these fields.

While quantum computers promise to outperform classical computers on a number of computationally intensive tasks, several hurdles prevent their widespread use. One such hurdle is the computational complexity of loading data into a quantum state. A quantum state encoding of the normal distribution is desirable for numerous computations, so there is a need for methods that efficiently load the normal distribution—or a reasonable approximation of the normal distribution—on a quantum computer.

Systems, apparatuses, methods, and computer program products are disclosed herein for preparation of a quantum state encoding an approximate normal distribution (QSEAND). The systems, apparatuses, methods, and computer program products disclosed herein provide solutions that enable the efficient loading of quantum states. These solutions enable the operation of quantum computers by eliminating a common type of computational bottleneck in state preparation.

In one example embodiment, a method is provided for preparation of a QSEAND in a set of qubits. The method includes initializing, via state initialization circuitry, the set of qubits by preparing the set of qubits in an initial quantum state. The method also includes encoding, via state preparation circuitry, the approximate normal distribution in the quantum state of the set of qubits, wherein encoding the approximate normal distribution causes the set of qubits to be in the QSEAND, and wherein encoding the approximate normal distribution comprises preparing, via the state preparation circuitry, the set of qubits to be in a quantum state representing a plurality of Fourier coefficients, and applying, via the state preparation circuitry, an inverse quantum Fourier transform to the set of qubits in the quantum state representing the plurality of Fourier coefficients to obtain the QSEAND. The method also includes utilizing, via the state transformation circuitry, the QSEAND, wherein the utilization alters or transfers the QSEAND.

In another example embodiment, an apparatus is provided for preparing a QSEAND in a set of qubits. The apparatus includes state initialization circuitry configured to initialize the set of qubits by preparing the set of qubits in an initial quantum state. The apparatus also includes state preparation circuitry configured to encode the approximate normal distribution in the quantum state of the set of qubits, wherein encoding the approximate normal distribution causes the set of qubits to be in the QSEAND, and wherein encoding the approximate normal distribution comprises preparing, via the state preparation circuitry, the set of qubits to be in a quantum state representing a plurality of Fourier coefficients, and applying, via the state preparation circuitry, an inverse quantum Fourier transform to the set of qubits in the quantum state representing the plurality of Fourier coefficients to obtain the QSEAND. The apparatus also includes state transformation circuitry configured to utilize the QSEAND, wherein the utilization alters or transfers the QSEAND.

In another example embodiment, a computer program product is provided for preparing a QSEAND in a set of qubits, the computer program product comprising at least one non-transitory computer-readable storage medium storing software instructions that, when executed, cause an apparatus to initialize the set of qubits by preparing the set of qubits in an initial quantum state. The software instructions, when executed, also cause the apparatus to encode the approximate normal distribution in the quantum state of the set of qubits, wherein encoding the approximate normal distribution causes the set of qubits to be in the QSEAND, and wherein encoding the approximate normal distribution comprises preparing the set of qubits to be in a quantum state representing a plurality of Fourier coefficients, and applying an inverse quantum Fourier transform to the set of qubits in the quantum state representing the plurality of Fourier coefficients to obtain the QSEAND. The software instructions, when executed, also cause the apparatus to utilize the QSEAND, wherein the utilization alters or transfers the QSEAND.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

3

Figure 1:
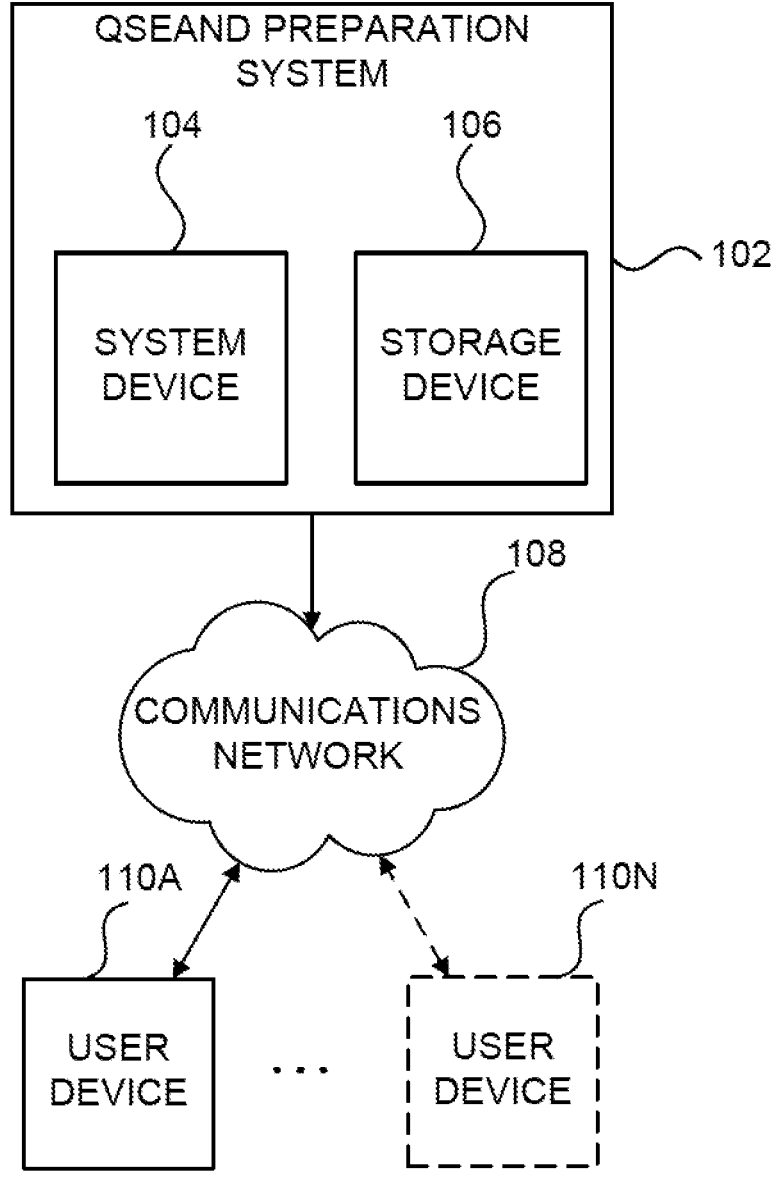

FIG. 1 illustrates a system in which some example embodiments may be used for preparation of a QSEAND, in accordance with some example embodiments described herein.

Figure 2:
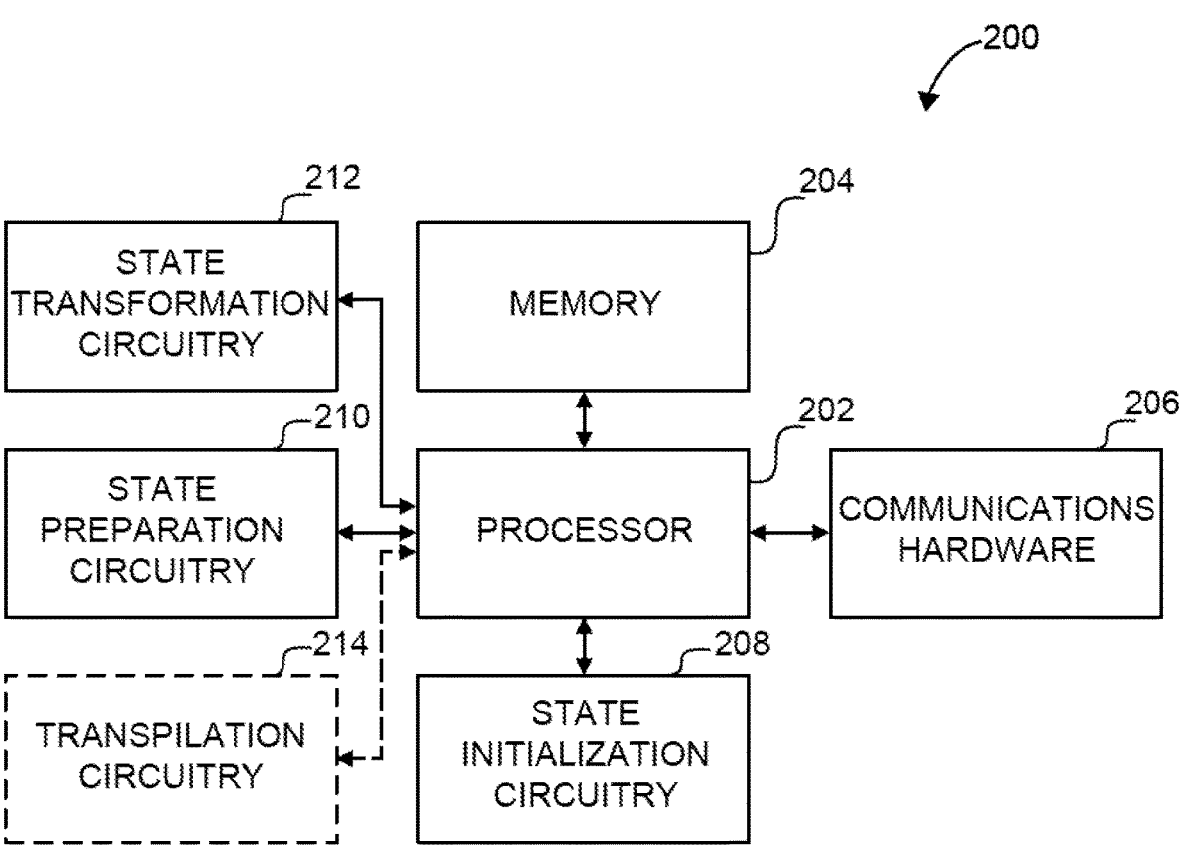

FIG. 2 illustrates a schematic block diagram of example circuitry embodying a device that may perform various operations in accordance with some example embodiments described herein.

Figure 3:
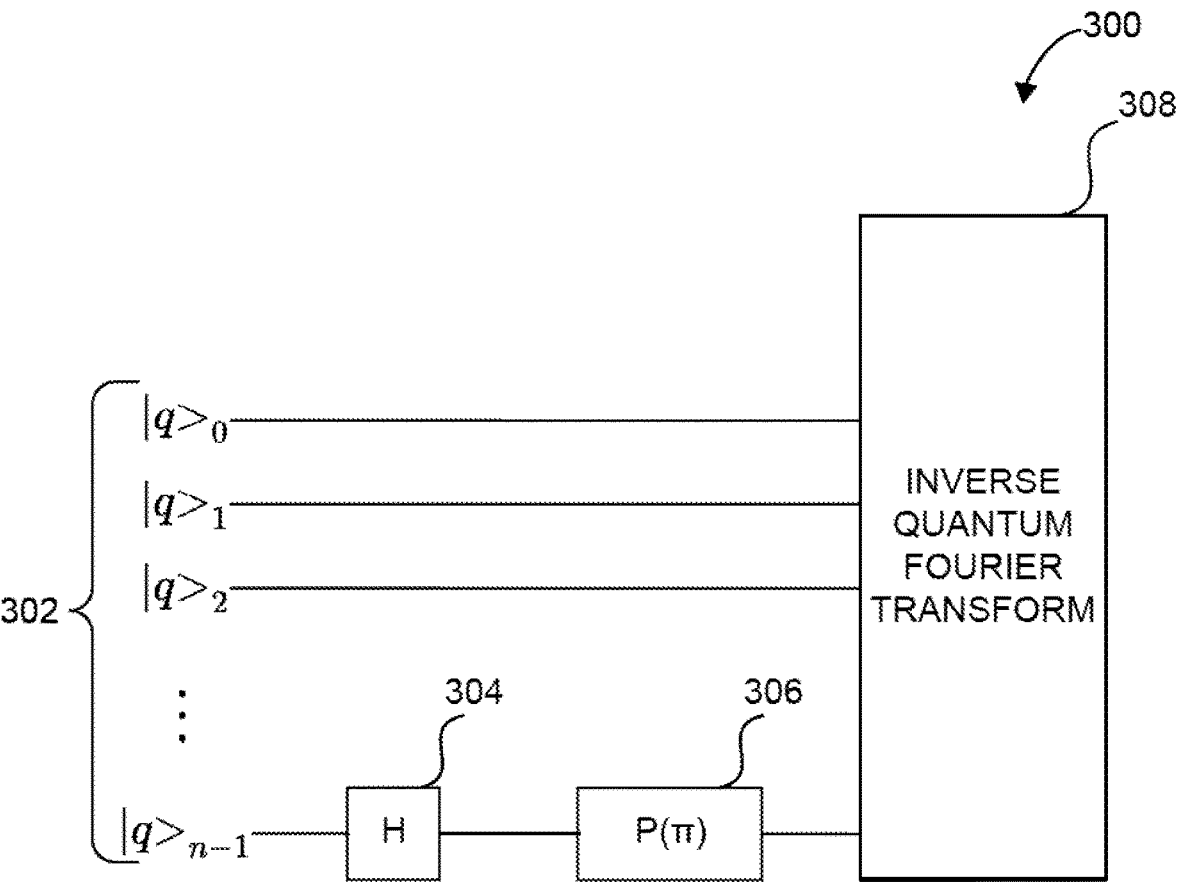

FIG. 3 illustrates an example quantum circuit used in some example embodiments described herein.

Figure 4:
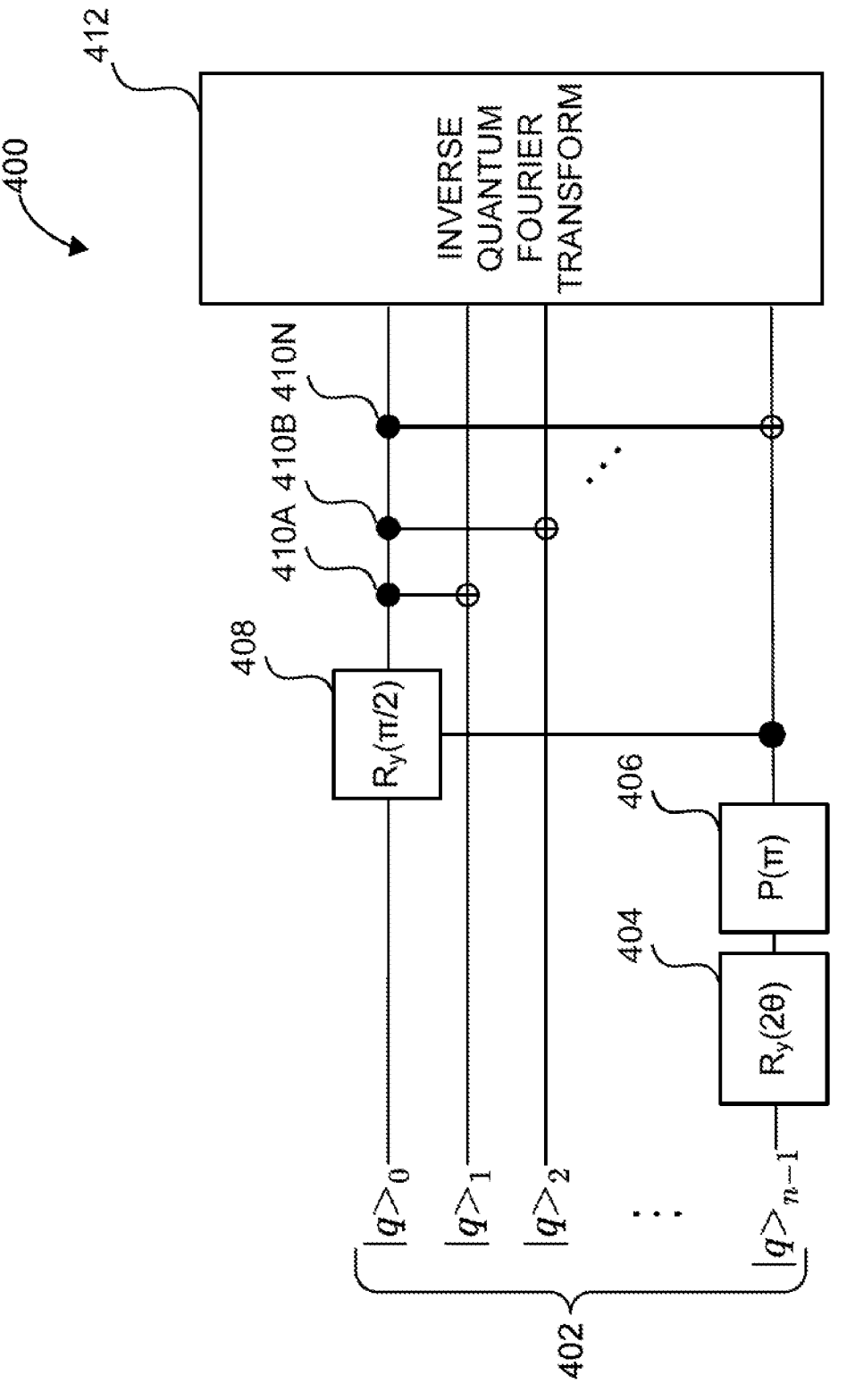

FIG. 4 illustrates another example quantum circuit used in some example embodiments described herein.

FIG. 5 illustrates an example flowchart for preparing a QSEAND, in accordance with some example embodiments described herein.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices.

The term "Fourier coefficient" is used to refer to coefficients of a Fourier series, where a Fourier series is a mathematical representation of a periodic function on an interval as a sum of terms. The terms of the sum comprise a sinusoidal function, or harmonic, and a Fourier coefficient.

The term "inverse quantum Fourier transform" is used to refer to an operation on a quantum state that applies an inverse discrete Fourier transform to values encoded in the quantum state. The discrete Fourier transform converts a series of complex numbers representing a function over an interval into a series of complex numbers representing the same function in the frequency domain over an interval.

The term "quantum computing device", "quantum computer", or "quantum device" is used to refer to a specialized computing device which stores and operates on information in quantum states. A quantum computer may make use of the quantum mechanical principles of superposition and entanglement to perform operations that are impossible on classical computers operating on classical information. Quantum computers include devices relying on technologies such as superconducting circuits, trapped ions, atoms in optical lattices, or any other of a wide array of technologies used to prepare and manipulate quantum states. Quantum computers may be gate-based, or perform operations dictated by a quantum circuit, or series of operators or logic gates that represent different transformations on the stored quantum states. A quantum computer may also be realized as a simulated system on a classical computer, though without the intrinsic speedup that a physical quantum computer provides through the use of superposition and entanglement.

The term "qubit" is used to refer to the fundamental unit of data on a quantum computer. A qubit may be initialized into a known quantum state, and the quantum state of the qubit may be manipulated by the quantum computer. The term qubit may refer to a single system with two orthonormal basis states, typically designated $0$ and $1$, but the term qubit as used here may also include other schemes of representing quantum data such as a qutrit, qudit, or the like which employ a different set of basis states. A plurality of qubits may also form a set of qubits that when considered together form product basis states that a quantum computer may act on. The term qubit as used here may also include schemes of storing quantum data from non-gate-based quantum computation systems such as adiabatic quantum computers.

The term "quantum circuit" is used to refer to a series of operations on a quantum state of a set of qubits comprising initializations, quantum gates, measurements, and other operations on qubits. A quantum circuit may be realized in varying ways depending on the hardware implementation of the quantum computer on which it is executed. A quantum circuit may also be realized as a simulation of a quantum computer on another device.

Overview

As noted above, methods apparatuses, systems, and computer program products are described herein that provide for preparing a quantum state encoding an approximation of the normal distribution. Traditionally, the encoding of the normal distribution in a quantum state is computationally difficult.

In contrast to conventional techniques for encoding a quantum state representing a normal distribution, example embodiments described herein efficiently prepare a QSEAND. Example embodiments prepare a representation of trigonometric functions raised to a power, doing so with computationally efficient quantum circuits. These representations of trigonometric functions rely on preparation of a quantum state encoding a plurality of Fourier coefficients. Increasing numbers of Fourier coefficients provide increasingly better approximations of the normal distribution. An inverse quantum Fourier transform is then applied to the quantum state encoding a plurality of Fourier coefficients to prepare the QSEAND.

Accordingly, the present disclosure sets forth systems, methods, and apparatuses that achieve an efficient representation of a QSEAND. There are many advantages of these and other embodiments described herein. For instance, efficient loading of an approximate normal distribution allows quantum computers to solve classes of problems efficiently that are hard for classical computers. Thus, example embodiments improve the functioning of quantum computers, expanding the scope of problems they may solve, and increasing their efficiency in solving these problems. In addition, example embodiments simplify the process of representing normally-distributed data, allowing users to work more efficiently, and allowing users without training regarding the specifics of loading data into a quantum state to leverage the advantages of quantum computers.

Although a high-level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment within which various embodiments may operate. As illustrated, a QSEAND preparation system 102 may include a system device 104 in communication with a storage device 106. Although system device 104 and storage device 106 are described in singular form, some embodiments may utilize more than one system device 104 and/or more than one storage device 106. Additionally, some embodiments of the QSEAND preparation system 102 may not require a storage device 106 at all. Whatever the implementation, the QSE-AND preparation system 102, and its constituent system device(s) 104 and/or storage device(s) 106 may receive and/or transmit information via communications network 108 (e.g., the Internet) with any number of other devices, such as one or more of user device 110A through user device 110N.

System device 104 may be implemented as one or more servers, which may or may not be physically proximate to other components of QSEAND preparation system 102. Furthermore, some components of system device 104 may be physically proximate to the other components of QSE-AND preparation system 102 while other components are not. System device 104 may receive, process, generate, and transmit data, signals, and electronic information to facilitate the operations of the QSEAND preparation system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the QSEAND preparation system 102. Storage device 106 may store information relied upon during operation of the QSEAND preparation system 102, such as various quantum circuit designs that may be used by the QSEAND preparation system 102, data and documents to be analyzed using the QSEAND preparation system 102, or the like. In addition, storage device 106 may store control signals, device characteristics, and access credentials enabling interaction between the QSEAND preparation system 102 and one or more of the user devices 110A-110N.

The one or more user devices 110A-110N may be embodied by any computing devices known in the art, such as desktop or laptop computers, tablet devices, smartphones, or the like. The one or more user devices 110A-110N need not themselves be independent devices, but may be peripheral devices communicatively coupled to other computing devices.

Although FIG. 1 illustrates an environment and implementation in which the QSEAND preparation system 102 interacts with one or more of user devices 110A-110N, in some embodiments users may directly interact with the QSEAND preparation system 102 (e.g., via communications hardware 206 of system device 104), in which case a separate user device may not be utilized. Whether by way of direct interaction or via a separate user device, a user may communicate with, operate, control, modify, or otherwise interact with the QSEAND preparation system 102 to perform the various functions and achieve the various benefits described herein.

Example Implementing Apparatuses

System device 104 of the QSEAND preparation system 102 (described previously with reference to FIG. 1) may be embodied by one or more computing devices or servers, shown as apparatus 200 in FIG. 2. As illustrated in FIG. 2, the apparatus 200 may include processor 202, memory 204, communications hardware 206, state initialization circuitry 208, state preparation circuitry 210, state transformation circuitry 212, and transpilation circuitry 214, each of which will be described in greater detail below. While the various components are only illustrated in FIG. 2 as being connected with processor 202, it will be understood that the apparatus 200 may further comprise a bus (not expressly shown in FIG. 2) for passing information amongst any combination of the various components of the apparatus 200. The apparatus 200 may be configured to execute various operations described above in connection with FIG. 1 and below in connection with FIG. 5.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof. The use of the term "processor" may be understood to include a classical processor (e.g., when simulating a quantum computer) or a quantum processor.

The processor 202 may be configured to execute software instructions stored in the memory 204 or otherwise accessible to the processor (e.g., quantum circuits or software instructions stored on a separate storage device 106, as illustrated in FIG. 1). In some cases, the processor may be configured to execute hard-coded functionality. As such, whether configured by hardware or software methods, or by a combination of hardware with software, the processor 202 represents an entity (e.g., physically embodied in circuitry) capable of performing operations according to various embodiments of the present invention while configured accordingly. Alternatively, as another example, when the processor 202 is embodied as an executor of quantum circuits or software instructions, the quantum circuits or software instructions may specifically configure the processor 202 to perform the algorithms and/or operations described herein when the quantum circuits or software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be quantum memory (QRAM or quantum random access memory, capable of storing quantum states), classical memory, or a combination thereof. The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may be configured to provide output to a user and, in some embodiments, to receive an indication of user input. It will be noted that some embodiments will not include such configurations, in which case user input may be received via a separate device such as a user device (e.g., one of user devices 110A-110N, shown in FIG. 1). The communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a state initialization circuitry 208 that initializes the set of qubits by preparing an initial quantum state. The state initialization circuitry 208 may utilize processor 202, memory 204, or any other hardware component included in the apparatus 200 to perform these operations, as described in connection with FIG. 5 below. The state initialization circuitry 208 may further utilize communications hardware 206 to gather data from a variety of sources (e.g. user device 110A through user device 110N or storage device 106, as shown in FIG. 1), to receive data from a user, and in some embodiments may utilize processor 202 and/or memory 204 to initialize the set of qubits by preparing an initial quantum state.

In addition, the apparatus 200 further comprises a state preparation circuitry 210 that prepares a quantum state approximating the normal distribution on a set of qubits. The state preparation circuitry 210 may utilize processor 202, memory 204, or any other hardware component included in the apparatus 200 to perform these operations, as described in connection with FIG. 5 below. The state preparation circuitry 210 may further utilize communications hardware 206 to gather data from a variety of sources (e.g. user device 110A through user device 110N or storage device 106, as shown in FIG. 1), to receive data from a user, and in some embodiments may utilize processor 202 and/or memory 204 to prepare the quantum state of a set of qubits.

In addition, the apparatus 200 further comprises a state transformation circuitry 212 that applies transformations to the quantum state of a set of qubits. The state transformation circuitry 212 may utilize processor 202, memory 204, or any other hardware component included in the apparatus 200 to perform these operations, as described in connection with FIG. 5 below. The state transformation circuitry 212 may further utilize communications hardware 206 to gather data from a variety of sources (e.g. user device 110A through user device 110N or storage device 106, as shown in FIG. 1), to receive data from a user, and in some embodiments may utilize processor 202 and/or memory 204 to apply transformations to the quantum state of a set of qubits.

Finally, the apparatus 200 may also comprise a transpilation circuitry 214 that transpiles a quantum circuit. The transpilation circuitry 214 may utilize processor 202, memory 204, or any other hardware component included in the apparatus 200 to perform these operations, as described in connection with FIG. 5 below. The transpilation circuitry 214 may further utilize communications hardware 206 to gather data from a variety of sources (e.g. user device 110A through user device 110N or storage device 106, as shown in FIG. 1), to receive data from a user, and in some embodiments may utilize processor 202 and/or memory 204 to transpile a quantum circuit.

Although components 202-212 are described in part using functional language, it will be understood that the particular implementations necessarily include the use of particular hardware. It should also be understood that certain of these components 202-212 may include similar or common hardware. For example, the state initialization circuitry 208, state preparation circuitry 210, state transformation circuitry 212, and transpilation circuitry 214 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the state initialization circuitry 208, state preparation circuitry 210, state transformation circuitry 212, and transpilation circuitry 214 may leverage processor 202, memory 204, or communications hardware 206, as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), memory 204, or communications hardware 206 for enabling any functions not performed by special-purpose hardware elements. In all embodiments, however, it will be understood that the state initialization circuitry 208, state preparation circuitry 210, state transformation circuitry 212, and transpilation circuitry 214 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 5 that loading the software instructions onto a computing device or apparatus produces a special-purpose machine comprising the means for implementing various functions described herein.

Having described specific components of example apparatus 200, general principles employed by an example apparatus 200 are discussed below.

DISCUSSION

This section introduces an encoding of the raised cosine distribution in the measurement probabilities of a quantum state, which can approximate the normal distribution. Fourier coefficients are encoded in the quantum state, and then the inverse quantum Fourier transform is applied. The same idea is used to provide increasingly better approximations for the normal distribution for a given number of qubits using more Fourier coefficients.

A quantum circuit implementation of trigonometric functions with increasingly better approximations of the normal distribution is described below. First, an encoding of the raised cosine function is shown for illustration purposes and to provide background.

Turning to FIG. 3, a quantum circuit 300 with n qubits 302 is shown. One may encode the quantum state $$\frac{1}{\sqrt{2}}|0\rangle_n - \frac{1}{\sqrt{2}}|2^{n-1}\rangle_n,$$

by applying Hadamard gate 304 and Phase gate 306 to qubit n. The inverse quantum Fourier transform 308 is applied next. The final quantum circuit 300 is denoted by $N_{1,n}$. The resulting state is $$|v_2\rangle_n = N_{1,n}|0\rangle_n = \sqrt{\frac{2}{N}}\sum_{k=0}^{N-1}\sin\left(k\frac{\pi}{N}\right)e^{i\left(\frac{\pi}{2}-k\frac{\pi}{N}\right)}|k\rangle_n.$$

$$|v_2\rangle_n = N_{1,n}|0\rangle_n = \sqrt{\frac{2}{N}}\sum_{k=0}^{N-1}\sin\left(k\frac{\pi}{N}\right)e^{i\left(\frac{\pi}{2}-k\frac{\pi}{N}\right)}|k\rangle_n.$$

The corresponding probability distribution is $$p(k) = \frac{2}{N}\cos^2\left(\left(k-\frac{N}{2}\right)\frac{\pi}{N}\right) = \frac{2}{N}\sin^2\left(k\frac{\pi}{N}\right)$$

for $0 \leq k < N$. This matches the probability density function of the raised cosine distribution, which is $$p(k) = \frac{1}{2\sigma}\left(1 + \cos\left(\frac{x-\mu}{\sigma}\pi\right)\right) = \frac{1}{\sigma}\cos^2\left(\frac{x-\mu}{2\sigma}\pi\right)$$

for $\mu - \sigma \leq x \leq \mu + \sigma$, when $$\mu = \frac{N}{2}$$

and $$\sigma = \frac{N}{2}.$$

The raised cosine distribution is an approximation for the normal distribution.

Turning to FIG. 4, a quantum circuit 400 with n qubits 402 is shown. The equivalent of three Fourier coefficients instead of two can be used to encode the quantum state $$\sqrt{\frac{2}{3}}|0\rangle_n - \frac{1}{\sqrt{6}}|2^{n-1}\rangle_n - \frac{1}{\sqrt{6}}|2^n - 1\rangle_n.$$

by applying y-rotation gate 404, phase gate 406, controlled y-rotation gate 408, and a sequence of n−1 controlled not gates 410A through 410N as shown in FIG. 4. Then, applying the inverse quantum Fourier transform 412 gives the quantum circuit 400 denoted $N_{2,n}$. The resulting state is $$|v_2\rangle_n = N_{2,n}|0\rangle_n = \sqrt{\frac{8}{3N}}\sum_{k=0}^{N-1}\sin^2\left(k\frac{\pi}{N}\right)|k\rangle_n.$$

-continued $$|v_2\rangle_n = N_{2,n} |0\rangle_n = \sqrt{\frac{8}{3N}} \sum_{k=0}^{N-1} \sin^2\left(k\frac{\pi}{N}\right)|k\rangle_n.$$

The corresponding probability distribution is $$p(k) = \frac{8}{3N}\cos^4\left(\left(k - \frac{N}{2}\right)\frac{\pi}{N}\right) = \frac{8}{3N}\sin^4\left(k\frac{\pi}{N}\right)$$

for 0≤k<N. The resulting probability distribution is a better approximation of the normal distribution than the raised cosine probability distribution.

Using more Fourier coefficients yields even better approximations. One can use five Fourier coefficients to create the state $$\frac{6}{\sqrt{70}}|0\rangle_n + \frac{1}{\sqrt{70}}|2^{n-2}\rangle_n +$$

$$\frac{1}{\sqrt{70}}|2^{n-1}-1\rangle_n - \frac{4}{\sqrt{70}}|2^{n-1}\rangle_n - \frac{4}{\sqrt{70}}|2^n-1\rangle_n,$$

followed by the inverse quantum Fourier transform. Denoting the composite unitary operator by $N_{4,n}$, the resulting state is:

$$|v_4\rangle_n = N_{4,n} |0\rangle_n = \sqrt{\frac{128}{35N}} \sum_{k=0}^{N-1} \sin^4\left(k\frac{\pi}{N}\right)|k\rangle_n.$$

$$|v_4\rangle_n = N_{4,n} |0\rangle_n = \sqrt{\frac{128}{35N}} \sum_{k=0}^{N-1} \sin^4\left(k\frac{\pi}{N}\right)|k\rangle_n.$$

The corresponding probability distribution is $$p(k) = \frac{128}{35N}\cos^8\left(\left(k - \frac{N}{2}\right)\frac{\pi}{N}\right) = \frac{128}{35N}\sin^8\left(k\frac{\pi}{N}\right)$$

$$p(k) = \frac{128}{35N}\cos^8\left(\left(k - \frac{N}{2}\right)\frac{\pi}{N}\right) = \frac{128}{35N}\sin^8\left(k\frac{\pi}{N}\right)$$

for 0≤k≤N, further improving the approximation of the normal distribution.

Having discussed general principles of example apparatus 200, example embodiments are described below in connection with a series of flowcharts.

Example Operations for Preparation of a QSEAND

Turning to FIG. 5, example flowcharts are illustrated that contain example operations implemented by example embodiments described herein. The operations illustrated in FIG. 5 may, for example, be performed by system device 104 of the QSEAND preparation system 102 shown in FIG. 1, which may be in turn embodied by an apparatus 200, which is shown and described in connection with FIG. 2. To perform the operations described below, the apparatus 200 may utilize one or more of processor 202, memory 204, communications hardware 206, state initialization circuitry 208, state preparation circuitry 210, state transformation circuitry 212, transpilation circuitry 214, and/or any combination thereof. It will be understood that user interaction with the QSEAND preparation system 102 may occur directly via communications hardware 206, or may instead be facilitated by a separate user device 110, as shown in FIG. 1, and which may have similar or equivalent physical componentry facilitating such user interaction.

Example operations are shown for preparation of a QSE-AND.

As shown by operation 502, the apparatus 200 includes means, such as memory 204, state initialization circuitry 208, or the like, for initializing the set of qubits by preparing the set of qubits in an initial quantum state. The initialization of the set of qubits is a repeatable process, and the initial quantum state is pre-determined. The set of qubits may be in any quantum state prior to being initialized, for example from a previous experiment or from random noise acting on the quantum state of the qubits. The quantum state of the set of qubits prior to initialization may be discarded and lost during initialization, so a measurement or transfer of the prior quantum state may be performed first. The initialization may proceed by the state initialization circuitry 208 causing the qubits to move to a known quantum state. In some embodiments, the known quantum state caused by the initialization is a ground state, wherein each qubit exists in its lowest allowed energy configuration. For example, some embodiments may have a characteristic time after which qubits spontaneously move from an energized state to a ground state, after which the system exists in a known state. In some embodiments, the known quantum state caused by the initialization is a polarization state. For example, in some embodiments the state initialization circuitry 208 may polarize light to create a set of qubits in an initial quantum state. In some embodiments, the set of qubits may be simulated, and the initialization of the set of qubits may proceed by the state initialization circuitry 208 operating on a memory state in a computing device simulating the set of qubits. The known quantum state caused by the initialization may be any quantum state, for example a state representing a zero on each qubit in the computational basis. The initialization is a repeatable process in the sense that the same initial quantum state may be prepared by the initialization process when repeated. The initial quantum state is pre-determined in the sense that the state is known prior to performing the initialization.

As shown by operation 504, the apparatus 200 includes means, such as memory 204, state preparation circuitry 210, or the like, encoding the approximate normal distribution in the quantum state of the set of qubits. Encoding the approximate normal distribution causes the set of qubits to be in the QSEAND. Values of the approximate normal distribution may lie within a pre-defined tolerance of values of the normal distribution. Encoding the approximate normal distribution by the state preparation circuitry 210 causes the set of qubits to be in a state that corresponds to the approximate normal distribution.

The state preparation circuitry 210 may encode the approximate normal distribution in the quantum state of the set of qubits by applying a sequence of operations, the sequence of operations comprising a number of quantum gates and/or measurements. A quantum gate may alter the state of one or more qubits in a reversible way. Quantum gates may create superpositions or entanglements of the quantum states of qubits, offering advantages over the more limited operations of classical computers. In some embodiments, measurements may be applied in the course of encoding the approximate normal distribution. Measurements may alter the quantum state of the qubit being measured by collapsing the wave function, and may provide information about the quantum state to other circuitry.

The encoding may result in the set of qubits being in a quantum state that encodes the approximate normal distribution. The quantum state that encodes the approximate normal distribution may encode the approximate normal distribution in a way that depends on a particular embodiment. In some embodiments, amplitudes of the quantum state may correspond to discrete values of intervals of the approximate normal distribution. In some embodiments, basis states of the set of qubits may represent discrete values of intervals of the approximate normal distribution. In some embodiments, ways of encoding the approximate normal distribution in a quantum state may use concepts of both amplitudes of the quantum state and basis states as described above. Other ways of encoding the approximate normal distribution quantum state may also be used.

The approximate normal distribution may require fewer computational steps to encode than the normal distribution, meaning the encoding applied by the state preparation circuitry 210 in operation 504 may require a less complex series of quantum gates and other operations than a comparable encoding of an exact normal distribution. The encoding applied in operation 504 may also belong to a class of algorithms that is computationally more efficient than encoding the exact normal distribution for asymptotically large values of the number of qubits.

The values of the approximate normal distribution may lie within a pre-defined tolerance of values of the normal distribution, which allows users to approximate the exact normal distribution at the level of the pre-defined tolerance. In some embodiments, the pre-defined tolerance may be chosen to be a value close to the quantum mechanical precision of the set of qubits on which the quantum state is prepared. A larger pre-defined tolerance may offer the advantage of employing a less complex encoding, while a smaller pre-defined tolerance may offer a more accurate approximation of the normal distribution.

As shown in FIG. 5, operation 504 may consist of substeps operation 508 and operation 510.

As shown by operation 508, the apparatus 200 may include means, such as memory 204, state preparation circuitry 210, or the like, for preparing the set of qubits to be in a quantum state representing a plurality of Fourier coefficients. Preparing the set of qubits in the initial quantum state to be in a quantum state representing a plurality of Fourier coefficients may be achieved by applying a sequence of operations, the sequence of operations comprising a number of quantum gates and measurements. The preparation may result in a state that encodes a plurality of Fourier coefficients, which are the coefficients of a Fourier series. The encoding may use amplitudes, basis states, and/or other techniques as discussed above. The descriptions of FIG. 3 and FIG. 4 above disclose an example embodiment where the amplitudes of the quantum state encode the plurality of Fourier coefficients. The encoding of the plurality of Fourier coefficients may use any number of the qubits from the set of qubits. The Fourier coefficients may represent components of the normal distribution that, when transformed by an inverse quantum Fourier transform, produce approximations of the normal distribution. Therefore, encoding greater numbers of Fourier coefficients may produce better approximations of the normal distribution.

As shown by operation 510, the apparatus 200 may include means, such as processor 202, memory 204, communications hardware 206, state preparation circuitry 210, or the like, for applying an inverse quantum Fourier transform to the set of qubits in the quantum state representing the plurality of Fourier coefficients to obtain a QSEAND. The quantum Fourier transform is the quantum computing algorithm analogous to the discrete Fourier transform, and the inverse quantum Fourier transform is the inverse operation of the quantum Fourier transform. Applying the inverse quantum Fourier transform to the set of qubits may be achieved by the state preparation circuitry 210 applying a sequence of operations, the sequence of operations comprising a number of quantum gates and measurements. The application of the inverse quantum Fourier transform may result in a state that encodes the approximate normal distribution. The encoding of the approximate normal distribution may use amplitudes, basis states, and/or other techniques as described above. In some embodiments, the inverse quantum Fourier transform may be implemented more efficiently than the analogous classical inverse Fourier transform, which may require exponentially more computational operations scaling with the number of qubits or bits. In some embodiments, the inverse quantum Fourier transform may operate on the amplitudes in the quantum state encoding plurality of Fourier coefficients, resulting in a QSEAND using amplitudes.

In some embodiments, the QSEAND may exist on a quantum device such as a quantum computer. In these embodiments the set of qubits may be physically in the quantum state described herein. In some embodiments, the QSEAND may exist as a simulated state in a simulation of a quantum device. In these embodiments, the set of qubits may be represented in memory by a device simulating the quantum device.

As shown by operation 506, the apparatus 200 includes means, such as processor 202, memory 204, communications hardware 206, state transformation circuitry 212, or the like, for utilizing the QSEAND, wherein the utilization alters or transfers the QSEAND. The QSEAND may be utilized in various example embodiments by measuring the QSEAND, by storing the QSEAND, by transferring the QSEAND, or by a combination thereof.

In some embodiments, the state transformation circuitry 212 may utilize the QSEAND by measuring the QSEAND. The measurement may be accomplished by the state transformation circuitry 212 applying a measurement operation on one or more qubits from the set of qubits in the quantum circuit. Measuring the quantum state of a qubit may collapse the wave function of the quantum state and produce an observable value. The measurement may be made with respect to a particular basis. For example, the measurement may be made with respect to the computational basis, producing a binary result analogous to a classical computer. Measurements may be made with respect to other bases depending on the particular embodiment. The result of the measurement value may be converted to a form usable in other circuitry after the measurement operation is applied. For example, the measurement may be collected as digital data and stored by a memory (e.g., memory 204 and/or storage device 106) in a histogram along with other repeated measurements as part of a larger experiment. The measurement may also be used as input to other circuitry such as classical or quantum devices, via the use of communications hardware 206.

In some embodiments, the QSEAND may be utilized by storing the information in the QSEAND. Storing may be accomplished by first identifying a target storage device. Quantum states may not be copied in the way that classical information may be copied, due to the results of the no-cloning theorem. The target storage device may be classical in nature, requiring a measurement of the QSEAND, or quantum in nature, requiring a transfer of the QSEAND. For example, if the QSEAND were to be used in a quantum circuit for a later computation, it may be moved to a form of quantum memory, or QRAM, allowing the QSEAND to be used later without performing a measurement. Information in the QSEAND may therefore be stored by performing a transfer or measurement of the quantum state. A transfer of the QSEAND may be performed, replacing the original quantum state but transporting it to another device. The stored quantum state may then be measured, transferred again, or operated on again in another way. A measurement may be performed, causing a wave function collapse, permanently altering the QSEAND. Once the measurement has been performed, transfer of the data via a remote host or local storage device may be performed transforming the QSEAND with a quantum circuit.

The QSEAND may be utilized by transforming the QSEAND. Transforming may be accomplished by the state transformation circuitry 212 applying a sequence of operations, the sequence of operations comprising a number of quantum gates and measurements. The quantum gates and measurements may make up a quantum circuit intended for a particular task. The resulting quantum state of the set of qubits may then be further utilized. The resulting quantum state of the set of qubits may contain information such as the result of a calculation. Further transformations may be applied, or the quantum state of the set of qubits may be measured or stored as described above.

In some embodiments, transpilation circuitry 214 may transpile a quantum circuit before operation 504, obtaining a transpiled quantum circuit. Transpilation here refers to a process analogous to compilation, wherein a set of computer instructions are translated from one language to another. To transpile the quantum circuit, transpilation circuitry 214 may make optimizations permitting the quantum circuit to run efficiently on a certain device, changing the set of operations to match the capabilities of a device or making other changes with the aim of improving performance on a target device. In some embodiments, the transpilation may require information about the attributes of a host device, and this information may be received by transpilation circuitry 214 via communications hardware 206. In some embodiments, transpilation may use additional circuitry or take place on another system. For example, the communications hardware 206 may transfer the quantum circuit to a remote host, and receive a transpiled quantum circuit in response. Alternatively, the transpilation circuitry 214 may locally transpile the quantum circuit. The transpiled quantum circuit may combine the operations of operation 508 and operation 510 into a single quantum circuit. The transpiled quantum circuit may also have a different computational complexity, requiring more or fewer computational steps than the original quantum circuit.

In some embodiments, encoding the approximate normal distribution in the quantum state of the set of qubits uses the transpiled quantum circuit. In these embodiments, the encoding utilizing the transpiled quantum circuit may prepare the same QSEAND but use a different set of quantum gates than the original quantum circuit that was not transpiled. The encoding utilizing the transpiled quantum circuit may be realizable on certain quantum computer hardware depending on the method of transpilation used.

In some embodiments, the communications hardware 206 may acquire user input providing attributes of the approximate normal distribution. The user input may be provided by text input, via a graphical user interface, via a peripheral device connected to apparatus 200 via the communications hardware 206, or by any other capabilities of the communications hardware 206. The user input may specify attributes of the approximate normal distribution such as the number of qubits, number of Fourier coefficients, or other parameters of the desired QSEAND.

In some embodiments, the state preparation circuitry 210 may encode the approximate normal distribution in the quantum state of the set of qubits according to the attributes of the approximate normal distribution from user input. The transformation may take on properties such as the number of qubits to use, the pre-determined precision of the approximate normal distribution, the number of Fourier coefficients, or other such properties. In taking on these properties, the state preparation circuitry 210 may utilize a set of quantum gates or other operations, or change parameters such as the number of qubits depending on the user input.

In some embodiments, the apparatus 200 may evaluate a price for a financial product. In these embodiments, the state initialization circuitry 208 may initialize a second set of qubits. The initialization of the second set of qubits may proceed in the same way as described above in operation 502 in connection with a first set of qubits, but as applied to the second set of qubits.

In some embodiments, the state transformation circuitry 212 may entangle the first set of qubits with the second set of qubits. Entangling the first set of qubits with the second set of qubits may be accomplished by applying an example transformation, F, that has the property $$F\left(\sum_{k=0}^{N-1} a_k |k\rangle_n |0\rangle_n\right) = \sum_{k=0}^{N-1} a_k |k\rangle_n |f(k)\rangle_n$$

for a first set of qubits made up of n qubits, a second set of qubits made up of m qubits, a set of amplitudes $a_k$ that represent amplitudes of the QSEAND, where $N=2^n$, and where $f$ is a function mapping integers $\{0, \ldots N-1\}$ to integers $\{0, \ldots 2^m-1\}$. After applying example transformation F, the first set of qubits and the second set of qubits may together be in an entangled quantum state that contains information about both the approximate normal distribution and the transformation F. The transformation F and corresponding function $f$ may encode, for example, a payoff function for the financial product. The term "payoff function" refers to a function for describing the benefit to be gained by a holder of the financial product under different conditions.

In some embodiments, the state transformation circuitry 212 may apply a first transformation H that result in the first set of qubits being in superposition. The first transformation H may consist of Hadamard gates applied to the qubits in the first set of qubits. The superposition quantum state may, when measured in the computational basis, result in a measurement of different basis states with certain underlying probabilities.

In some embodiments, the state transformation circuitry 212 may apply a second transformation U to the second set of qubits. The Hermitian conjugate of the second transformation U encodes a linear distribution function. The second transformation U may consist of a series of quantum gates and other operations on a quantum state. The term "Hermitian conjugate" refers to the transformation given by the conjugate transpose of a transformation in matrix form. When a transformation encodes a linear distribution function, this refers to preparing a quantum state where the amplitudes are given by a linear function, for example, $$|\psi\rangle_n = A \sum_{k=0}^{N-1} k|k\rangle,$$

where A may be a real number, and the |k≥ may be the N basis states of the set of qubits.

In some embodiments, the state transformation circuitry 212 may measure a quantum state of the first set of qubits and the second set of qubits to evaluate a price for the financial product. The quantum state of the first set of qubits and second set of qubits, after applying the example steps described above, may encode information about the probability distribution of payoffs and the payoff function for a financial product in such a way that a price may be calculated by measuring the quantum state. The measurement of the quantum state of the first set of qubits and the second set of qubits may entail multiple repeated measurements in order to determine an amplitude of the quantum state. For example, the first set of qubits and the second set of qubits may be initialized and transformed according to the example steps described above, and the process may be repeated to obtain a large sample of repeated measurements. Each time the process is repeated, the measurement may be recorded, and the distribution of measurements may be used to determine an amplitude of the quantum state.

In some embodiments, the state transformation circuitry 212 may utilize the QSEAND, wherein the QSEAND models a feature of a dataset used to build a linear classifier, wherein the distribution of the feature of the dataset lies within a pre-defined tolerance of values of the normal distribution. Normally distributed data enhances model building, since many analysis techniques make assumptions about their inputs being normally distributed. For example, linear discriminant analysis (LDA) may be used to find a set of features of input data that may be used to characterizes two or more classes of objects. LDA guarantees a solution if the data is normally distributed, due to the fact that the conditional probabilities used in LDA are computed by taking products of normal distributions, producing normally distributed conditional probabilities. LDA is one example of an analysis that may be implemented on a quantum computer and may benefit from the computational advantage quantum computers offer over classical computers. In some embodiments, the QSEAND prepared by state preparation circuitry 210 may be used in such an analysis where a normal distribution model of data is required. For example, the state transformation circuitry 212 may transform the QSEAND, entangling the QSEAND with a quantum state of a second set of qubits, to compute various statistical estimates, such as the estimated mean or estimated covariance of a higher-dimensional dataset. The state transformation circuitry 212 may then transfer or measure the statistical estimates to construct a linear discriminant, which may be used to reduce the dimensionality of the dataset, act as a linear classifier for input data, or other applications.

As described above, example embodiments provide methods and apparatuses that enable efficient preparation of a QSEAND on a set of qubits. Example embodiments thus provide tools that overcome problems faced when preparing quantum states on quantum devices, such as the complexity and depth of the quantum circuit required. By efficiently representing the approximate normal distribution, example embodiments thus reduce the complexity and depth of quantum circuits needed to prepare a desired quantum state.

The reduction of complexity and depth of quantum circuits for preparing quantum states is essential to realizing an advantage in quantum computing over classical computing. With existing approaches, preparing certain quantum states introduces computational complexity that offsets and negates advantages gained by efficient quantum algorithms for certain computations. Embodiments disclosed herein avoid the problem of quantum state preparation on quantum devices by efficiently encoding the approximate normal distribution, thus recouping the advantage offered by quantum computing in a wide variety of applications.

As these examples all illustrate, embodiments contemplated herein provide technical solutions that solve real-world problems faced while preparing a QSEAND. And while quantum state preparation has been an issue since the earliest days of quantum computing, the advent of numerous quantum algorithms and applications promising quantum advantage over their classical computing counterparts has made the demand for efficient preparation of quantum states more acute. In particular, approximating the normal distribution by encoding it in a quantum state has real-world applications in machine learning, financial mathematics, and other areas where quantum computers play a critical role.

FIG. 5 illustrates operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for preparation of a quantum state encoding an approximate normal distribution (QSEAND) in a set of qubits, the method comprising:
initializing, via state initialization circuitry, the set of qubits by preparing the set of qubits in an initial quantum state;
encoding, via state preparation circuitry, the approximate normal distribution in the quantum state of the set of qubits, wherein encoding the approximate normal distribution causes the set of qubits to be in the QSEAND, and wherein encoding the approximate normal distribution comprises:
preparing, via the state preparation circuitry, the set of qubits to be in a quantum state representing a plurality of Fourier coefficients, and
applying, via the state preparation circuitry, an inverse quantum Fourier transform to the set of qubits in the quantum state representing the plurality of Fourier coefficients to obtain the QSEAND; and
utilizing, via state transformation circuitry, the QSEAND, wherein the utilization alters or transfers the QSEAND.

2. The method of claim 1, wherein the quantum state representing the plurality of Fourier coefficients represents three Fourier coefficients or five Fourier coefficients.

3. The method of claim 1, wherein utilizing the QSEAND comprises:
measuring the QSEAND;
storing information from the QSEAND;
further transforming the QSEAND with a quantum circuit; or
a combination thereof.

4. The method of claim 1, further comprising:
before encoding the approximate normal distribution:
transpiling, via transpilation circuitry, a quantum circuit to obtain a transpiled quantum circuit,
wherein encoding the approximate normal distribution in the quantum state of the set of qubits uses the transpiled quantum circuit.

5. The method of claim 1, further comprising:
acquiring, via communications hardware, user input providing attributes of the approximate normal distribution;
wherein encoding the approximate normal distribution in the quantum state of the set of qubits proceeds according to the attributes of the approximate normal distribution from the user input.

6. The method of claim 1, wherein utilizing the QSEAND comprises:
initializing, via the state initialization circuitry, a second set of qubits;
entangling, via the state transformation circuitry, the set of qubits with the second set of qubits using a transformation derived from a payoff function of a financial product;
applying a first transformation H, via the state transformation circuitry, to the set of qubits, wherein the first transformation H results in the set of qubits being in superposition;
applying a second transformation U, via the state transformation circuitry, to the second set of qubits, wherein the Hermitian conjugate of U encodes a linear distribution function; and
measuring, via the state transformation circuitry, a quantum state of the set of qubits and the second set of qubits to evaluate a price for the financial product.

7. The method of claim 1, wherein the QSEAND models a feature of a dataset used to build a linear classifier, wherein the distribution of the feature of the dataset lies within a pre-defined tolerance of values of the normal distribution.

8. The method of claim 1, wherein values of the approximate normal distribution lie within a pre-defined tolerance of values of the normal distribution.

9. An apparatus for preparing a QSEAND in a set of qubits, the apparatus comprising:
state initialization circuitry configured to:
initialize the set of qubits by preparing the set of qubits in an initial quantum state;
state preparation circuitry configured to:
encode an approximate normal distribution in the quantum state of the set of qubits, wherein encoding the approximate normal distribution causes the set of qubits to be in the QSEAND, and wherein encoding the approximate normal distribution comprises:
preparing, via the state preparation circuitry, the set of qubits to be in a quantum state representing a plurality of Fourier coefficients, and
applying, via the state preparation circuitry, an inverse quantum Fourier transform to the set of qubits in the quantum state representing the plurality of Fourier coefficients to obtain the QSEAND; and
state transformation circuitry configured to:
utilize the QSEAND, wherein the utilization alters or transfers the QSEAND.

10. The apparatus of claim 9, wherein the quantum state representing the plurality of Fourier coefficients represents three Fourier coefficients or five Fourier coefficients.

11. The apparatus of claim 9, wherein utilizing the QSEAND comprises:
measuring the QSEAND;
storing information from the QSEAND;
further transforming the QSEAND with a quantum circuit; or
a combination thereof.

12. The apparatus of claim 9, further comprising:
transpilation circuitry configured to:

before encoding the approximate normal distribution: transpile a quantum circuit to obtain a transpiled quantum circuit, wherein the state transformation circuitry is further configured such that encoding the approximate normal distribution in the quantum state of the set of qubits uses the transpiled quantum circuit.

13. The apparatus of claim 9, further comprising:
communications hardware configured to:

acquire user input providing attributes of the approximate normal distribution, wherein encoding the approximate normal distribution in the quantum state of the set of qubits proceeds according to the attributes of the approximate normal distribution from the user input.

14. The apparatus of claim 9, wherein utilizing the QSEAND comprises:

initializing a second set of qubits;

entangling the set of qubits with the second set of qubits using a transformation derived from a payoff function of a financial product;

applying a first transformation H to the set of qubits;

wherein the first transformation H creates a superposition quantum state in the set of qubits;

applying a second transformation U to the second set of qubits, wherein the Hermitian conjugate of U encodes a linear distribution function; and measuring a quantum state of the set of qubits and second set of qubits to evaluate a price for the financial product.

15. The apparatus of claim 9, wherein the QSEAND models a feature of a dataset used to build a linear classifier, wherein the distribution of the feature of the dataset lies within a pre-defined tolerance of values of the normal distribution.

16. The apparatus of claim 9, wherein values of the approximate normal distribution lie within a pre-defined tolerance of values of the normal distribution.

17. A computer program product for preparing a QSEAND in a set of qubits, the computer program product comprising at least one non-transitory computer-readable storage medium storing software instructions that, when executed, cause an apparatus to:

initialize the set of qubits by preparing the set of qubits in an initial quantum state;

encode an approximate normal distribution in the quantum state of the set of qubits, wherein encoding the approximate normal distribution causes the set of qubits to be in the QSEAND, and wherein encoding the approximate normal distribution comprises:

preparing the set of qubits to be in a quantum state representing a plurality of Fourier coefficients, and applying an inverse quantum Fourier transform to the set of qubits in the quantum state representing the plurality of Fourier coefficients to obtain the QSEAND; and utilize the QSEAND, wherein the utilization alters or transfers the QSEAND.

18. The computer program product of claim 17, wherein values of the approximate normal distribution lie within a pre-defined tolerance of values of the normal distribution.

19. The computer program product of claim 17, wherein the software instructions, when executed, further cause the apparatus to:

before encoding the approximate normal distribution: transpiling a quantum circuit to obtain a transpiled quantum circuit, wherein encoding the approximate normal distribution in the quantum state of the set of qubits uses the transpiled quantum circuit.

20. The computer program product of claim 17, wherein utilizing the QSEAND comprises:

initializing a second set of qubits;

entangling the set of qubits with the second set of qubits using a transformation derived from a payoff function of a financial product;

applying a first transformation H to the set of qubits, wherein the first state preparation transformation H creates a superposition quantum state in the set of qubits;

applying a second transformation U to the second set of qubits, wherein the Hermitian conjugate of U encodes a linear distribution function; and measuring a quantum state of the set of qubits and the second set of qubits to evaluate a price for the financial product.

* * * * *